Aug. 7, 1962 A. H. COSBY 3,048,046
POWER TRANSMISSION FOR VARIABLE SPEED AND TORQUE
Filed April 11, 1960 2 Sheets-Sheet 1

INVENTOR.

Alger H. Cosby

Aug. 7, 1962 A. H. COSBY 3,048,046
POWER TRANSMISSION FOR VARIABLE SPEED AND TORQUE
Filed April 11, 1960 2 Sheets-Sheet 2
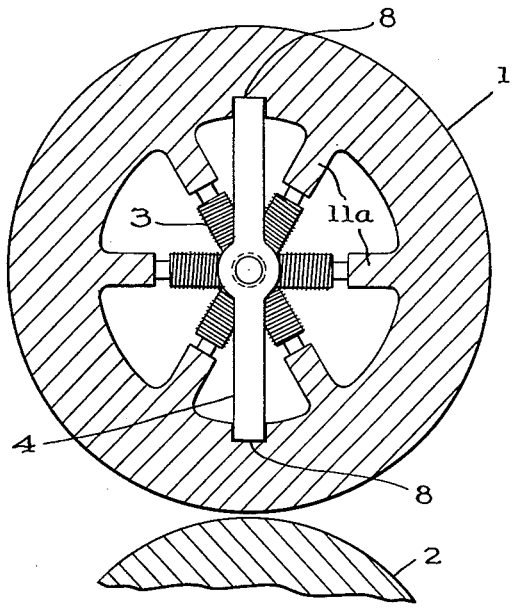
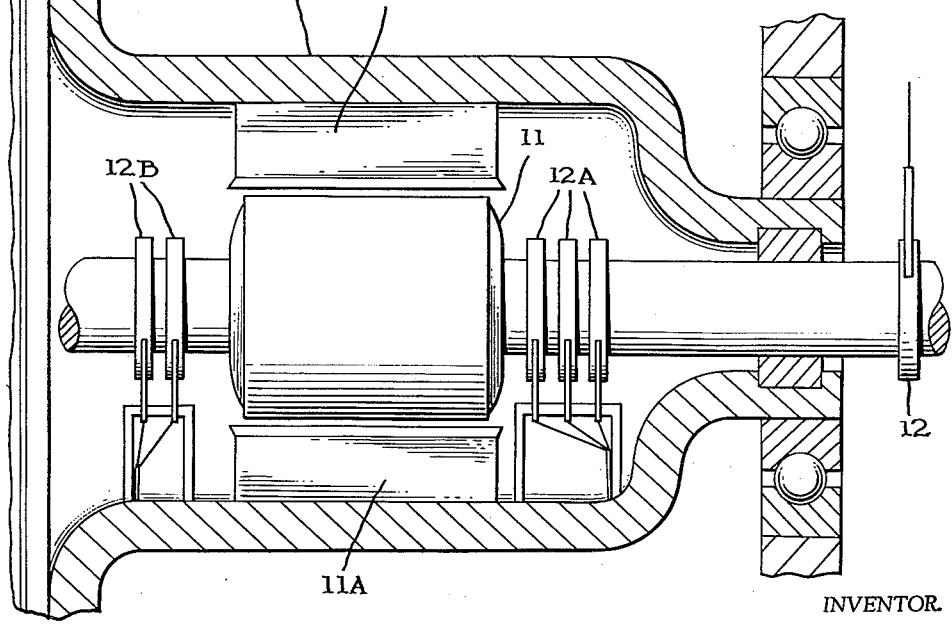
INVENTOR.
Alger H. Cosby

United States Patent Office 3,048,046
Patented Aug. 7, 1962

3,048,046
POWER TRANSMISSION FOR VARIABLE
SPEED AND TORQUE
Algar H. Cosby, Alexandria, Va.
(Box 204A, R.F.D. 1, Chantilly, Va.)
Filed Apr. 11, 1960, Ser. No. 21,512
3 Claims. (Cl. 74—191)

The present invention relates to an electromagnetic power transmission device for varying the speed and torque of a driven member.

Thus, it is an object of my invention to provide an electromagnetic power transmission device composed of at least two truncated cones.

Another object of my invention is to provide an electromagnetic power transmission device composed of a driving cone, a driven cone and a field generating component movable within the driving cone for selectively adjusting the desired speed ratio.

Still another object of my invention is to provide an electromagnetic power transmission device composed of spaced coacting driving and driven cones and a paramagnetic fluid in which the device operates in order to nullify the effect of the clearance or air gap between such cones.

Another object of my invention is to provide a driving cone and a driven cone each constructed of a suitable paramagnetic material, such as mild steel.

Another object of my invention is to provide an electromagnetic power transmission device composed of at least two truncated cones, a field generating component movable within one of said cones, and a power means for moving such component.

Still another object of my invention is to provide a power transmission device by combining a torque multiplier with the principles of a magnetic clutch and utilizing in such combination the best features of each.

Other objects and advantages of my invention reside in the construction, the cooperation, and the mode of operation of the elements of my combination as will become apparent from the following description.

In the drawings:

FIG. 2 is a cross sectional view on enlarged scale taken on the line 2—2 of FIG. 1 and showing details of the driving cone and the movable field generating component.

FIG. 3 is a cross sectional view on enlarged scale taken on the line 3—3 of FIG. 1 and showing the positioning motor for the field generating component.

Figure 1:
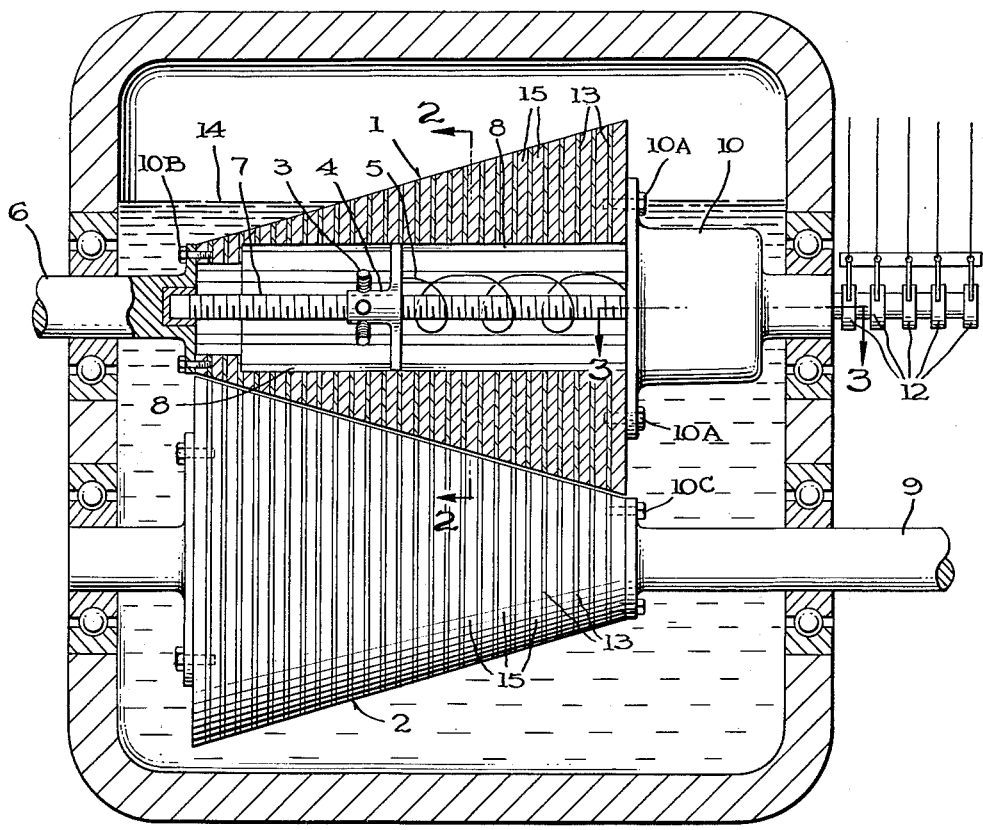
FIG. 1 is an elevational view, partly in section, showing the driving and driven cones, the field generating component, and the paramagnetic fluid.

Referring to the drawings and as best seen in FIG. 1, each of the interacting cones, 1 and 2, is composed of thin laminates 15 of a suitable paramagnetic material, such as mild steel. These laminates 15 are separated, one from another, with a semidielectric material 13 which, in addition to bonding the magnetic laminates together, acts to localize the effect of the inductive field. Within the driving cone 1 is the field generating component 3 and adjacent to the cone 1 is the field generating component positioning motor 11. The output cone 2 is connected, for example, by bolts 10C to a power-take-off shaft 9 which in turn may be connected to a reversing device or directly to a load, as applicable.

As best seen in FIG. 2, the driving cone 1 has movably positioned therein a field generating component 3, which consists of the pole pieces and positioning block 4 and the tracks in which it moves.

Referring now to FIG. 3 which shows the housing enclosing the field generating component positioning motor 11, it can be seen that the armature of the motor 11 is integral to the end of the positioning lead screw 7. The field pieces 11A of the motor are formed integral for example, by bolts 10A to the housing 10, which in turn is attached to the drive cone 1. The motor is series wound and current is supplied to it from slip rings 12A which are electrically connected to slip rings 12, outside the case. Slip rings 12B which are electrically connected to slip rings 12 supply current to the field generating component 3 through conductor 5.

The principle of operation of this power transmitting device is simple. External mechanical power is supplied from some type of prime mover, such as an internal combustion engine, through shaft 6. The drive cone, 1, is attached, for example, by bolts 10B to the drive shaft 6 from the prime mover, and its speed is a function of the speed of the prime mover.

Within the drive cone 1, an axial cavity is located, in which a movable electromagnetic field generating device, 3, is located. Electric current is supplied through an electrical conductor, 5, to the field generating device, 3, which consists of a number of wire wound cores, arranged about a hub which is positioned within the drive cone by the positioning lead screw 7. When the wire wound cores are excited by application of electric current, a magnetic field is created, surrounding the cores and extending throughout the adjacent laminations of the drive cones, 1. The magnetic field in the cone laminations is restricted from excessive dissipation throughout the cone by the inter-laminar semidielectric material. The field created in a particular section of the drive cone, selected by positioning the field generating component, induces a magnetic effect in the adjacent laminations of a driven cone 2. This inductive effect causes cone 2 to tend to follow cone 1 in rotational motion and link magnetically to it. The ratio of diameters of the cones at the point selected by positioning the field generating component determines the ratio of output speed and torque to input speed and torque. The cone surfaces are set as close together as possible to clear each other without interference. To minimize air gap between the cones and provide a solid flux path, the cones are surrounded by a fluid, 14, consisting of a finely divided paramagnetic material mixed with a lubricant which may be either a liquid or a finely divided solid, such as graphite.

This transmission device is applicable to situations requiring variable torque multiplication when supplied with power by a prime mover of relatively constant speed. The output speed may be varied from a low-speed, high-torque condition to high speed, low torque and shifted from one to the other smoothly, with no stepping or shifting effect. Any intermediate output speed may be selected simply by positioning the field generating component within the driving cone. This device may also be utilized as a clutch through the control of the current supplied to the field generating component.

By interrupting the flow of current to the electromagnet, the transmission is disengaged due to the collapse of the magnetic field which links the driving and driven members.

The position of the field generating component may be selected by moving the threaded block, 4, positioned in the drive cone by axial tracks, 8, and the central threaded shaft or positioning lead screw 7. The threaded shaft is rotated, or the field generating component is otherwise axially positioned, by a suitable device, such as a reversible electric motor or any alternate electric, hydraulic or mechanical means.

The lead screw 7 and reversible electric motor combination as shown in the figure may be incorporated within the outer casing of the device, since the end of the field generating component positioning lead screw acts as the motor's armature and the motor's stator in this instance is integral to the shell or casing, 10, which is fastened to the drive cone for example, by bolts or the like 10A.

Current is supplied to the field generating component through slip rings, 12 and 12B, which are linked by electrical paths internal to shaft 7, and thence to the field generating component through electrical conductor, 5. Current is supplied to the field generating component positioning motor 11 through slip rings 12 and 12A.

While I have described a particular execution of the invention, it is to be understood that I wish to be limited not by this described configuration, but solely by the claims granted to me.

I claim:

1. A device for the transmission of power and variation of torque and speed consisting of a pair of cooperating paramagnetic truncated cones arranged with interacting surfaces thereof disposed in closely spaced relation throughout the length of said cones to provide therebetween a clearance, each cone comprising adjacent laminations of paramagnetic material separated by semidielectric material, one of said cones being a driven cone and the other of said cones being a drive cone, said drive cone having an axial bore therein, an electrically energized, variably positioned, field generating component non-rotatably mounted within and axially movable along said bore, means for supplying electric current to said field generating component for generating a magnetic field when excited by said current to induce a magnetic field in the laminations of the drive cone adjacent said field generating component, and thence to the corresponding adjacent laminations of the driven cone, causing the driven cone to follow the driving cone, and which field generating component determines by its position axially within the bore of the drive cone the desired ratio of input speed to output speed, and a paramagnetic fluid in which the interacting surfaces of the cooperating cones are immersed in order to provide a solid flux path within the clearance between said interacting surfaces.

2. A device as claimed in claim 1 including a lead screw disposed within the axial bore of the drive cone and threadedly connected to the field generating component, and a reversible motor having its field pieces attached to the drive cone and its armature attached to the lead screw, whereby relative rotation between the armature and the drive cone will cause the field generating component to move axially along the lead screw to vary the position of said field generating component within said drive cone and thereby vary the ratio of input speed to output speed of the drive and driven cones.

3. A device as claimed in claim 1 in which the paramagnetic fluid in which the interacting surfaces of the cones are immersed comprises finely divided paramagnetic material composed of particles of approximately eight microns in size mixed with a lubricant.

References Cited in the file of this patent

UNITED STATES PATENTS

| | | |
|---|---|---|
| 1,840,726 | Lange | Jan. 12, 1932 |
| 2,424,873 | Abbrecht | July 29, 1947 |
| 2,640,364 | Nelson | June 2, 1953 |
| 2,688,879 | Logan et al. | Sept. 14, 1954 |
| 2,803,968 | Van Tilburg | Aug. 27, 1957 |